United States Patent
Miyoshi et al.

(10) Patent No.: US 9,230,746 B2
(45) Date of Patent: Jan. 5, 2016

(54) NONAQUEOUS ELECTROLYTIC SOLUTION AND ELECTROCHEMICAL DEVICE USING THE SAME

(75) Inventors: Kazuhiro Miyoshi, Ube (JP); Masahide Kondo, Ube (JP)

(73) Assignee: UBE INDUSTRIES, LTD, Ube-shi (JP)

( * ) Notice: Subject to any disclaimer, the term of this patent is extended or adjusted under 35 U.S.C. 154(b) by 287 days.

(21) Appl. No.: 13/992,106

(22) PCT Filed: Dec. 5, 2011

(86) PCT No.: PCT/JP2011/078041
§ 371 (c)(1),
(2), (4) Date: Aug. 14, 2013

(87) PCT Pub. No.: WO2012/077623
PCT Pub. Date: Jun. 14, 2012

(65) Prior Publication Data
US 2013/0337346 A1    Dec. 19, 2013

(30) Foreign Application Priority Data
Dec. 6, 2010    (JP) ................................. 2010-271751

(51) Int. Cl.
| | |
|---|---|
| H01M 6/16 | (2006.01) |
| H01G 9/025 | (2006.01) |
| H01G 11/60 | (2013.01) |
| H01M 10/0567 | (2010.01) |
| H01M 10/0569 | (2010.01) |
| H01M 10/052 | (2010.01) |

(52) U.S. Cl.
CPC ............. *H01G 9/025* (2013.01); *H01G 11/60* (2013.01); *H01M 10/052* (2013.01); *H01M 10/0567* (2013.01); *H01M 10/0569* (2013.01); *H01M 6/164* (2013.01); *H01M 6/168* (2013.01); *H01M 2300/0025* (2013.01); *Y02E 60/13* (2013.01); *Y02T 10/7022* (2013.01)

(58) Field of Classification Search
CPC .......... H01M 10/052; H01M 10/0567; H01M 10/0569; H01M 6/164; H01M 6/168
See application file for complete search history.

(56) References Cited

U.S. PATENT DOCUMENTS

| | | | |
|---|---|---|---|
| 5,418,682 A * | 5/1995 | Warren, Jr. ............. | H01G 9/038 252/62.2 |
| 2004/0013946 A1 | 1/2004 | Abe et al. | |
| 2006/0035144 A1 | 2/2006 | Shimizu et al. | |
| 2008/0057402 A1 | 3/2008 | Abe et al. | |
| 2008/0102369 A1 | 5/2008 | Sakata et al. | |
| 2009/0047582 A1 | 2/2009 | Kim et al. | |
| 2012/0251893 A1 | 10/2012 | Sakata et al. | |
| 2013/0071733 A1 | 3/2013 | Abe et al. | |
| 2014/0178757 A1 | 6/2014 | Sakata et al. | |

FOREIGN PATENT DOCUMENTS

| | | |
|---|---|---|
| CN | 101170201 A | 4/2008 |
| JP | 2004 179146 | 6/2004 |
| JP | 2006 73513 | 3/2006 |
| JP | 2009 523305 | 6/2009 |
| JP | 2009 158240 | 7/2009 |
| JP | 2009 245864 | 10/2009 |
| JP | 2010 165653 | 7/2010 |
| WO | WO 97/35332 A1 | 9/1997 |
| WO | 2007 081169 | 7/2007 |
| WO | 2007 094625 | 8/2007 |

OTHER PUBLICATIONS

Combined Office Action and Search Report issued Dec. 24, 2014 in Chinese Patent Application No. 201180058776.3 (with English Translation of Category of Cited Documents).
Extended European Search Report issued Feb. 18, 2015 in Patent Application No. 11847494.9.
Zheng Honghe, et al., "Development and Prospects of the Additives in Electrolytes of Lithium Ion Batteries" Chemistry, vol. 67, 2004, pp. 1-9 with English language translation.
International Search Report Issued Mar. 13, 2012 in PCT/JP11/078041 filed Dec. 5, 2011.

* cited by examiner

*Primary Examiner* — Jonathan Jelsma
(74) *Attorney, Agent, or Firm* — Oblon, McClelland, Maier & Neustadt, L.L.P.

(57) ABSTRACT

The object of the present invention is to provide a nonaqueous electrolytic solution that can improve the electrochemical properties in a broad temperature range and an electrochemical device using the same. A nonaqueous electrolytic solution prepared by dissolving an electrolyte salt in a nonaqueous solvent, wherein the nonaqueous solvent includes 0.1 to 30% by volume of a fluorine atom-containing cyclic carbonate, and further the nonaqueous electrolytic solution includes 0.001 to 5% by mass of a branched dinitrile compound in which the main chain of an alkylene chain linking the two nitrile groups has 2 or more and 4 or less of the carbon number.

17 Claims, No Drawings

NONAQUEOUS ELECTROLYTIC SOLUTION AND ELECTROCHEMICAL DEVICE USING THE SAME

TECHNICAL FIELD

The present invention relates to a nonaqueous electrolytic solution that can improve the electrochemical properties in a broad temperature range and an electrochemical device using the same.

BACKGROUND ART

In recent years, an electrochemical device, particularly a lithium secondary battery is widely used for a small-sized electronic equipment such as a cellular phone and a laptop computer, an electric vehicle or storage of the electric power. These electronic equipments or a vehicle is likely to be used in a broad temperature range of high temperature in the midsummer, low temperature in the arctic weather, and the like, and thus it is required to improve the electrochemical properties in a broad temperature range with a good balance.

Particularly in order to prevent global warming, it is urgently needed to cut $CO_2$ discharge, and immediate diffusion of a hybrid electric vehicle (HEV), a plug-in hybrid electric vehicle (PHEV), or a battery electric vehicle (BEV) is demanded, among environment-friendly cars loaded with an electrical storage device including an electrochemical device such as a lithium secondary battery and a capacitor. However, a vehicle has long migration length, and thus is likely used in a region of broad temperature range from tropical, very hot region to arctic weather region. Accordingly, these electrochemical devices for a vehicle are demanded to have no deterioration for the electrochemical properties even when used in a broad temperature range from high temperature to low temperature.

Note that, in the present description, the term of the lithium secondary battery is used as a concept including the so-called lithium ion secondary battery.

A lithium secondary battery mainly consists of a positive electrode and a negative electrode containing materials which can absorb and release lithium, and a nonaqueous electrolytic solution including a lithium salt and a nonaqueous solvent, and as the nonaqueous solvent, a carbonate such as ethylene carbonate (EC) and propylene carbonate (PC) is used.

Further, as the negative electrode, metal lithium, and a metal compound (metal element, oxide, alloy with lithium, etc.) and a carbon material which can absorb and release lithium are known. Particularly, lithium secondary battery produced by using a carbon material, such as coke, artificial graphite, natural graphite and the like which can absorb and release lithium are widely put into practical use.

In a lithium secondary battery produced by using, for example, highly crystallized carbon materials, such as artificial graphites, natural graphites and the like as a negative electrode material, it is known that decomposed products and gases generated from a solvent in a nonaqueous electrolytic solution which is reduced and decomposed on a surface of a negative electrode in charging the battery detract from a desired electrochemical reaction of the battery, so that a cycle property thereof is worsened. Also, when the decomposed products of the nonaqueous solvent are deposited, lithium can not smoothly be absorbed onto and released from a negative electrode, and the electrochemical characteristics thereof are liable to be worsened in a broad temperature range.

Further, in a lithium secondary battery produced by using lithium metal and alloys thereof, metal element, such as tin, silicon and the like and oxides thereof as a negative electrode material, it is known that an initial battery capacity thereof is high but a nonaqueous solvent is acceleratingly reduced and decomposed as compared with a negative electrode of a carbon material since a micronized powdering of the material is promoted during cycles and that battery performances, such as a battery capacity and a cycle property are worsened to a large extent. Also, in a case the micronized powdering of the negative electrode material and the deposition of the decomposed products of the nonaqueous solvent are deposited, lithium can not smoothly be absorbed onto and released from the negative electrode, and the electrochemical characteristics thereof are liable to be worsened in a broad temperature range.

On the other hand, in a lithium secondary battery produced by using, for example, $LiCoO_2$, $LiMn_2O_4$, $LiNiO_2$, $LiFePO_4$ and the like as a positive electrode, it is known that decomposed products and gases generated from a solvent in a nonaqueous electrolytic solution which is partially oxidized and decomposed in a local part on an interface between the positive electrode material and the nonaqueous electrolytic solution in a charging state detract from a desired electrochemical reaction of the battery, so that the electrochemical characteristics thereof are worsened as well in a broad temperature range.

As described above, the decomposed products and gases generated when a nonaqueous electrolytic solution is decomposed on a positive electrode or a negative electrode may interfere with a migration of lithium ions or may swell the battery, and the battery performance is thereby worsened. In spite of the above situations, electronic equipments in which a lithium secondary battery are mounted are advanced more and more in multi-functionalization and tend to be increased in an electric power consumption. As a result thereof, a lithium secondary battery are advanced more and more in an elevation of a capacity, and a nonaqueous electrolytic solution is reduced in a volume thereof occupied in the battery, wherein the electrode is increased in a density, and a useless space volume in the battery is reduced. Accordingly, observed is a situation in which the electrochemical characteristics thereof in a broad temperature range are liable to be worsened by decomposition of only a small amount of the nonaqueous electrolytic solution.

In Patent Document 1, proposed is a nonaqueous electrolytic solution that contains a chain-type saturated hydrocarbon dinitrile compound in which a nitrile group is bonded to both ends of a chain-type saturated hydrocarbon compound. For example, it is suggested that an electrolytic solution in which a lithium salt is dissolved in a mixed solvent of 2-methylglutaronitrile:ethylene carbonate:dimethyl carbonate=50:25:25 (volume ratio), has broad potential window.

Further, in Patent Documents 2 and 3, it is disclosed that safety with respect to thermal shock can be improved in a lithium secondary battery using a nonaqueous electrolytic solution containing fluoroethylene carbonate and succinonitrile.

PRIOR ART DOCUMENTS

Patent Documents

Patent Document 1: Japanese Patent Publication No. 2010-165653
Patent Document 2: Pamphlet of WO 2007/081169
Patent Document 3: Pamphlet of WO 2007/094625

SUMMARY OF THE INVENTION

Problem to be Solved by the Invention

The object of the present invention is to provide a nonaqueous electrolytic solution that can improve the electrochemical properties in a broad temperature range, and an electrochemical device using the same.

Means for Solving the Problems

The present inventors investigated in detail, the performances of the nonaqueous electrolytic solution of the prior arts described above. As a result, it cannot be said in the actual circumstances that the nonaqueous electrolytic solutions of the Patent Documents sufficiently solve the problems of improving the electrochemical properties in a broad temperature range such as the electric discharge property at low temperature after storage at high temperature.

Upon this, the present inventors have repeated the researches earnestly to solve the problems, and found that the electrochemical properties, particularly the electrochemical properties of a lithium battery in a broad temperature range, can be improved by means of a nonaqueous electrolytic solution in which an electrolyte salt is dissolved in a nonaqueous solvent, which contains 0.001 to 5% by mass of a branched dinitrile compound in which the main chain of an alkylene chain linking the two nitrile groups has 2 or more and 4 or less of the carbon number, in combination with a certain amount of fluorine atom-containing cyclic carbonate, or a certain amount of a linear dinitrile compound in which an alkylene chain linking the two nitrile groups has 2 or more and 6 or less of the carbon number, whereby to complete the present invention.

Specifically, the present invention provides (1) to (7) described below.

(1) A nonaqueous electrolytic solution prepared by dissolving an electrolyte salt in a nonaqueous solvent, wherein the nonaqueous solvent includes 0.1 to 30% by volume of a fluorine atom-containing cyclic carbonate, and further the nonaqueous electrolytic solution includes 0.001 to 5% by mass of a branched dinitrile compound in which the main chain of an alkylene chain linking the two nitrile groups has 2 or more and 4 or less of the carbon number.

(2) A nonaqueous electrolytic solution prepared by dissolving an electrolyte salt in a nonaqueous solvent, including 0.001 to 5% by mass of a branched dinitrile compound in which the main chain of an alkylene chain linking the two nitrile groups has 2 or more and 4 or less of the carbon number, and including 0.001 to 5% by mass of a linear dinitrile compound in which an alkylene chain linking the two nitrile groups has 2 or more and 6 or less of the carbon number.

(3) A nonaqueous electrolytic solution prepared by dissolving an electrolyte salt in a nonaqueous solvent, wherein the nonaqueous solvent contains 0.1 to 30% by volume of a fluorine atom-containing cyclic carbonate, and further the nonaqueous electrolytic solution contains 0.001 to 5% by mass of a branched dinitrile compound in which the main chain of an alkylene chain linking the two nitrile groups has 2 or more and 4 or less of the carbon number, and contains 0.001 to 5% by mass of a linear dinitrile compound in which an alkylene chain linking the two nitrile groups has 2 or more and 6 or less of the carbon number.

(4) The nonaqueous electrolytic solution described in (2) or (3), wherein as the linear dinitrile compound is used those of which the carbon number of the alkylene chain linking the two nitrile groups that constitutes the linear dinitrile compound is different from the carbon number of the main chain of the alkylene chain of the branched dinitrile compound.

(5) The nonaqueous electrolytic solution described in any one of (1) to (4), wherein the branched dinitrile compound is those in which at least one hydrogen atom of the alkylene chain of the main chain in the branched dinitrile compound is substituted with an alkyl group of 1 or more and 2 or less of the carbon number.

(6) The nonaqueous electrolytic solution described in (5), wherein the branched dinitrile compound is those in which only one hydrogen atom that is bonded to the α-position carbon of one nitrile group among the two nitrile groups in the branched dinitrile compound is substituted with a methyl group.

(7) An electrochemical device including a positive electrode, a negative electrode and a nonaqueous electrolytic solution prepared by dissolving an electrolyte salt in a nonaqueous solvent, wherein the nonaqueous electrolytic solution is the nonaqueous electrolytic solution described in any one of (1) to (6).

Effects of the Invention

According to the present invention, it is possible to provide a nonaqueous electrolytic solution that can improve the electrochemical properties in a broad temperature range, particularly the electric discharge property at low temperature after storage at high temperature, and an electrochemical device such as a lithium battery using the same.

DESCRIPTION OF EMBODIMENTS

The present invention relates to a nonaqueous electrolytic solution and an electrochemical device using the same.

[Nonaqueous Electrolytic Solution]

The nonaqueous electrolytic solution of the present invention is a nonaqueous electrolytic solution in which an electrolyte salt is dissolved in a nonaqueous solvent, which contains 0.001 to 5% by mass of a branched dinitrile compound in which the main chain of an alkylene chain linking the two nitrile groups has 2 or more and 4 or less of the carbon number, in combination with a certain amount of a fluorine atom-containing cyclic carbonate, or a certain amount of a linear dinitrile compound in which an alkylene chain linking the two nitrile groups has 2 or more and 6 or less of the carbon number.

The reasons that the nonaqueous electrolytic solution of the present invention can drastically improve the electrochemical properties in a broad temperature range are not necessarily clear, but followings are considered.

It is considered that in the branched dinitrile compound contained in the nonaqueous electrolytic solution of the present invention, in which the main chain of an alkylene chain linking the two nitrile groups has 2 or more and 4 or less of the carbon number, the alkyl group substituting at least one hydrogen atom of the alkylene chain of the main chain becomes steric hindrance, and thus the branched dinitrile compound is gently reacted at the active spot on the positive electrode surface at the time of the first charge, and a coating film is formed that suppresses the oxidative decomposition of the electrolytic solution.

Furthermore, it is understood that when the branched dinitrile compound is in combination with a fluorine atom-containing cyclic carbonate or a linear dinitrile compound in which an alkylene chain linking the two nitrile groups has 2 or more and 6 or less of the carbon number, namely a compound having a certain electron-withdrawing group that is different in the structure from the branched dinitrile compound in which the main chain of an alkylene chain linking the two nitrile groups has 2 or more and 4 or less of the carbon number, these compounds form a coating film in cooperation with the branched dinitrile compound in which the main chain of an alkylene chain linking the two nitrile groups has 2 or more and 4 or less of the carbon number, and the Li ion permeability of the formed coating film improves, and also the effects of suppressing oxidative decomposition of the electrolytes further increases, which induces effects of prominently improving the electrochemical properties in a broad temperature range from low temperature to high temperature.

The content of the branched dinitrile compound in which the main chain of an alkylene chain linking the two nitrile groups has 2 or more and 4 or less of the carbon number contained in the nonaqueous electrolytic solution of the present invention, is preferably 0.001 to 5% by mass in the nonaqueous electrolytic solution. If the content is 5% by mass or less, the possibility of the decline in the electrochemical properties in a broad temperature range due to too much formation of the coating film on the electrode is small. If the content is 0.001% by mass or more, formation of the coating film is sufficient, and the effects of improving the electrochemical properties in a broad temperature range are enhanced. The content is preferably 0.05% by mass or more, and more preferably 0.2% by mass or more. Further, the upper limit thereof is preferably 3% by mass or less, and more preferably 2% by mass or less.

The branched dinitrile compound in which the main chain of an alkylene chain linking the two nitrile groups has 2 or more and 4 or less of the carbon number is more preferably those in which at least one hydrogen atom of the alkylene chain of the main chain is substituted with an alkyl group of 1 or more and 4 or less of the carbon number, and further preferably those in which at least one hydrogen atom of the alkylene chain of the main chain is substituted with an alkyl group of 1 or more and 2 or less of the carbon number.

Specifically, 2-methylsuccinonitrile, 2-ethylsuccinonitrile, 2,3-dimethylsuccinonitrile, 2-ethyl-3-methylsuccinonitrile, 2,3-diethylsuccinonitrile, 2,2-dimethylsuccinonitrile, 2,2,3-trimethylsuccinonitrile, 2,2,3,3-tetramethylsuccinonitrile, 2-methylglutaronitrile, 2-ethylglutaronitrile, 2,4-dimethylglutaronitrile, 2-ethyl-4-methylglutaronitrile, 2,4-diethylglutaronitrile, 2,2-dimethylglutaronitrile, 2,2,4-trimethylglutaronitrile, 2,2,4,4-tetramethylglutaronitrile, 2,3-dimethylglutaronitrile, 2,3,4-trimethylglutaronitrile, 3-methylglutaronitrile, 3,3-dimethylglutaronitrile, 2-methyladiponitrile, 2-ethyladiponitrile, 2,5-dimethyladiponitrile, 2-ethyl-5-methyladiponitrile, 2,5-diethyladiponitrile, 2,2-dimethyladiponitrile, 2,2,5-trimethyladiponitrile, 2,2,5,5-tetramethyladiponitrile, 2,3-dimethyladiponitrile, 2,4-dimethyladiponitrile, 2,3,5-trimethyladiponitrile, 3-methyladiponitrile and 3,3-dimethyladiponitrile may be suitably mentioned.

Among these, the branched dinitrile compound is preferably those in which only one H at the α-position carbon ($CH_2$) of one of the nitrile groups is substituted with a methyl group since the effects of improving the electrochemical properties in a broad temperature range are enhanced, and specifically, 2-methylsuccinonitrile, 2,3-dimethylsuccinonitrile, 2-ethyl-3-methylsuccinonitrile, 2,2,3-trimethylsuccinonitrile, 2-methylglutaronitrile, 2,4-dimethylglutaronitrile, 2-ethyl-4-methylglutaronitrile, 2,2,4-trimethylglutaronitrile, 2,3-dimethylglutaronitrile, 2,3,4-trimethylglutaronitrile, 2-methyladiponitrile, 2,5-dimethyladiponitrile, 2-ethyl-5-methyladiponitrile, 2,2,5-trimethyladiponitrile, 2,3-dimethyladiponitrile, 2,4-dimethyladiponitrile, 2,3,5-trimethyladiponitrile are preferable. Furthermore, the branched dinitrile compound is preferably those in which the carbon at the α position ($CH_2$) of the other nitrile group is unsubstituted since the reactivities of the two nitrile groups are different, and thus the coating film is formed without too much minuteness, and the Li ion permeability is further improved. From such viewpoint, 2-methylsuccinonitrile, 2-methylglutaronitrile, 2,3-dimethylglutaronitrile, 2-methyladiponitrile, 2,3-dimethyladiponitrile, 2,4-dimethyladiponitrile are particularly preferable.

The ratio of the volume occupied by the fluorine atom-containing cyclic carbonate in the nonaqueous solvent in the nonaqueous electrolytic solution of the present invention is preferably 0.1% by volume or more, more preferably 1% by volume or more, and particularly preferably 3% by volume or more. Further, the upper limit is preferably 30% by volume or less, more preferably 25% by volume or less, and particularly preferably 20% by volume or less.

The fluorine atom-containing cyclic carbonate is preferably one or more kinds selected from 4-fluoro-1,3-dioxolane-2-one (FEC), and trans- or cis-4,5-difluoro-1,3-dioxolane-2-one (hereinafter, the two are referred to as "DFEC" as a general term), and particularly preferably ones including FEC.

The content of the linear dinitrile compound in which an alkylene chain linking the two nitrile groups has 2 or more and 6 or less of the carbon number contained in the nonaqueous electrolytic solution of the present invention is preferably 0.001 to 5% by mass in the nonaqueous electrolytic solution. If the content is 5% by mass or less, the possibility of the decline in the electrochemical properties in a broad temperature range due to too much formation of the coating film on the electrode is small. Further, if the content is 0.001% by mass or more, formation of the coating film is sufficient, and the effects of improving the electrochemical properties in a broad temperature range are enhanced. The content in the nonaqueous electrolytic solution is preferably 0.05% by mass or more, and more preferably 0.2% by mass or more. Further, the upper limit thereof is preferably 3% by mass or less, and more preferably 2% by mass or less.

When the branched dinitrile compound in which the main chain of an alkylene chain linking the two nitrile groups has 2 or more and 4 or less of the carbon number is used in combination with the linear dinitrile compound in which an alkylene chain linking the two nitrile groups has 2 or more and 6 or less of the carbon number in the nonaqueous electrolytic solution of the present invention, the total content of the branched dinitrile compound in which the main chain of an alkylene chain linking the two nitrile groups has 2 or more and 4 or less of the carbon number and the linear dinitrile compound in which an alkylene chain linking the two nitrile groups has 2 or more and 6 or less of the carbon number, is preferably 0.01 to 7% by mass in the nonaqueous electrolytic solution. If the total content is 7% by mass or less, the possibility of the decline in the electrochemical properties in a broad temperature range due to too much formation of the coating film on the electrode is small. Further, if the total content is 0.01% by mass or more, formation of the coating film is sufficient, and the effects of improving the electrochemical properties in a broad temperature range are enhanced. The total content in the nonaqueous electrolytic solution is preferably 0.1% by mass or more, and more preferably 0.3% by mass or more. Further, the upper limit thereof is preferably 5% by mass or less, more preferably 4% by mass or less, and particularly preferably 3.5% by mass or less.

Furthermore, when the branched dinitrile compound in which the main chain of an alkylene chain linking the two nitrile groups has 2 or more and 4 or less of the carbon number is used in combination with the linear dinitrile compound in which an alkylene chain linking the two nitrile groups has 2 or more and 6 or less of the carbon number, the mass ratio of the content of the linear dinitrile compound in which an alkylene chain linking the two nitrile groups has 2 or more and 6 or less of the carbon number with respect to the content of the branched dinitrile compound in which the main chain of an alkylene chain linking the two nitrile groups has 2 or more and 4 or less of the carbon number is preferably 0.01 to 0.96, and more preferably 0.2 to 0.8 since the effects of improving the electrochemical properties in a broad temperature range are enhanced.

Further, when the branched dinitrile compound in which the main chain of an alkylene chain linking the two nitrile groups has 2 or more and 4 or less of the carbon number is used in combination with the linear dinitrile compound in which an alkylene chain linking the two nitrile groups has 2 or more and 6 or less of the carbon number, it is more preferable that the total content of the branched dinitrile compound in which the main chain of an alkylene chain linking the two nitrile groups has 2 or more and 4 or less of the carbon number and the linear dinitrile compound in which an alkylene chain linking the two nitrile groups has 2 or more and 6 or less of the carbon number is in the above-mentioned range, and the mass ratio of the content of the linear dinitrile compound in which an alkylene chain linking the two nitrile groups has 2 or more and 6 or less of the carbon number with respect to the content of the branched dinitrile compound in which the main chain of an alkylene chain linking the two nitrile groups has 2 or more and 4 or less of the carbon number is in the above-mentioned range since the electrochemical properties in a further broad temperature range are improved.

The linear dinitrile compound in which an alkylene chain linking the two nitrile groups has 2 or more and 6 or less of the carbon number is specifically succinonitrile, glutaronitrile, adiponitrile, pimelonitrile, suberonitrile.

Among these, adiponitrile, pimelonitrile, suberonitrile are more preferable since the effects of suppressing oxidative decomposition of the electrolytic solution are further improved, and thus the effects of improving the electrochemical properties in a broad temperature range are enhanced when used by combination with the compound of which the carbon number of the alkylene chain linking the two nitrile groups is 4 or more.

In addition, when the branched dinitrile compound in which the main chain of an alkylene chain linking the two nitrile groups has 2 or more and 4 or less of the carbon number is used in combination with the linear dinitrile compound in which an alkylene chain linking the two nitrile groups has 2 or more and 6 or less of the carbon number, the linear dinitrile compound in which an alkylene chain linking the two nitrile groups has 2 or more and 6 or less of the carbon number is preferably those of which the carbon number of the alkylene chain linking the two nitrile groups that constitutes the compound is different from the carbon number of the main chain of the alkylene chain of the branched dinitrile compound in which the main chain of an alkylene chain linking the two nitrile groups has 2 or more and 4 or less of the carbon number, since the effects of suppressing oxidative decomposition of the electrolytic solution are further improved.

Combination with the nonaqueous solvent, the electrolyte salt, and further the other additives described below allows the nonaqueous electrolytic solution of the present invention to exert synergistically the effects of improving the electrochemical properties in a broad temperature range.

[Nonaqueous Solvent]

As the examples of the nonaqueous solvent used in the nonaqueous electrolytic solution of the present invention, cyclic carbonate, chain ester, lactone, ether, amide, phosphoric acid ester, sulfone, mononitrile, S=O bond-containing compound etc may be mentioned, those containing both of cyclic carbonate and chain ester are preferable.

Meanwhile, the term chain ester is used as a concept including chain carbonate and chain carboxylic acid ester.

As suitable examples of the cyclic carbonate besides the fluorine atom-containing cyclic carbonate, ethylene carbonate (EC), propylene carbonate (PC), 1,2-butylene carbonate, 2,3-butylene carbonate, vinylene carbonate (VC), vinyl ethylene carbonate (VEC) etc. may be mentioned.

The nonaqueous solvent preferably includes ethylene carbonate and/or propylene carbonate since the resistance of the coating film formed on the electrode is reduced. The content of ethylene carbonate and/or propylene carbonate is 3% by volume or more, more preferably 5% by volume or more, and particularly preferably 7% by volume or more in the total volume of the nonaqueous solvent. In addition, the upper limit is 45% by volume or less, more preferably 35% by volume or less, and particularly preferably 25% by volume or less.

Further, the nonaqueous solvent preferably includes cyclic carbonate having carbon-carbon double bond since the electrochemical properties in a broad temperature range are further improved. As the cyclic carbonate having carbon-carbon double bond, VC, VEC are more preferable and VC is particularly preferable.

The content of the cyclic carbonate having carbon-carbon double bond is 0.001% by volume or more, more preferably 0.1% by volume or more, and particularly preferably 0.3% by volume or more with respect to the total volume of the nonaqueous solvent. Further, the upper limit is 5% by volume or less, further preferably 4% by volume or less, and particularly preferably 3% by volume or less.

The total content of the cyclic carbonate that is a combination of the fluorine atom-containing cyclic carbonate and the cyclic carbonate besides the fluorine atom-containing cyclic carbonate is preferably used in a range of 10% by volume to 40% by volume with respect to the total volume of the nonaqueous solvent. If the total content is 10% by volume or more, there is no decline in the electrochemical properties in a broad temperature range due to the decline of the electrical conductivity of the nonaqueous electrolytic solution. If the total content is 40% by volume or less, there is no possibility of the decline in the electrochemical properties in a broad temperature range due to the increasing the viscosity of the nonaqueous electrolytic solution. Thus, the above-mentioned range is preferable.

These cyclic carbonates may be used in one kind. However, these cyclic carbonates are preferably used in 2 or more kinds since the electrochemical properties in a broad temperature range are further improved, and particularly preferably 3 or more. A suitable combination of these cyclic carbonates is preferably EC and PC, EC and VC, PC and VC, VC and FEC, EC and FEC, PC and FEC, VEC and FEC, FEC and DFEC, EC and DFEC, PC and DFEC, VC and DFEC, VEC and DFEC, EC and PC and VC, EC and PC and FEC, EC and VC and FEC, EC and VC and VEC, PC and VC and FEC, EC and VC and DFEC, PC and VC and DFEC, EC and PC and VC and FEC, EC and PC and VC and DFEC, etc. Among the combinations, as the combination of 2 kinds, the combinations of EC and VC, EC and FEC, PC and FEC, VC and FEC, etc. are preferable, and as the combinations of 3 or more kinds, the combination of EC and PC and VC, EC and PC and FEC, EC and VC and FEC, PC and VC and FEC, EC and PC and VC and FEC, etc. are preferable.

As the chain ester, asymmetrically-chain carbonates such as methylethyl carbonate (MEC), methylpropyl carbonate (MPC), methylisopropyl carbonate (MIPC), methylbutyl carbonate and ethylpropyl carbonate, symmetrically-chain carbonates such as dimethyl carbonate (DMC), diethyl carbonate (DEC), dipropyl carbonate and dibutyl carbonate, and chain carboxylic acid esters such as methyl propionate, ethyl propionate, methyl acetate and ethyl acetate may be suitably mentioned.

The content of the chain ester is not particularly limited, but is preferably used in a range of 60 to 90% by volume with respect to the total volume of the nonaqueous solvent. If the content is 60% by volume or more, the viscosity of the nonaqueous electrolytic solution does not increase excessively, and if the content of the chain ester is 90% by volume or less, the possibility of the decline in the electrochemical properties in a broad temperature range due to the decline of the electrical conductivity of the nonaqueous electrolytic solution is small. Thus, the above-mentioned range is preferable.

Among the chain esters, a chain ester containing a methyl group selected from dimethyl carbonate, methylethyl carbonate, methylpropyl carbonate, methylisopropyl carbonate, methylbutyl carbonate, methyl propionate, methyl acetate and ethyl acetate is preferable, and chain carbonate having a methyl group is particularly preferable.

Further, when the chain carbonate is used, those containing both of the symmetrically-chain carbonate and the asymmetrically-chain carbonate are preferable, and those containing a higher content of the symmetrically-chain carbonate than that of the asymmetrically-chained carbonate are more preferable.

The ratio of the volume occupied by the symmetrically-chain carbonate in the chain carbonate is preferably 51% by volume or more, and more preferably 55% by volume or more. The upper limit is more preferably 95% by volume or less, and more preferably 85% by volume or less. As the symmetrically-chain carbonate, those containing dimethyl carbonate or diethyl carbonate are particularly preferable.

The asymmetrically-chain carbonate is more preferably those having a methyl group, and particularly preferably methylethyl carbonate.

The above-mentioned case is preferable since the electrochemical properties in a further broader temperature range are improved.

The ratio of the cyclic carbonate and the chain ester is preferably 10:90 to 45:55, more preferably 15:85 to 40:60, and particularly preferably 20:80 to 35:65 as the volume ratio of cyclic carbonate:chain ester from the viewpoint of improvement of the electrochemical properties in a broad temperature range.

As the other nonaqueous solvents, tertiary carboxylic acid esters such as methyl pivalate, butyl pivalate, hexyl pivalate and octyl pivalate, oxalic acid esters such as dimethyl oxalate, ethylmethyl oxalate and diethyl oxalate, cyclic ethers such as tetrahydrofuran, 2-methyltetrahydrofuran, 1,3-dioxolane, 1,3-dioxane and 1,4-dioxane, chain ethers such as 1,2-dimethoxyethane, 1,2-diethoxyethane and 1,2-dibutoxyethane, amides such as dimethylformamide, phosphoric acid esters such as trimethyl phosphate, tributyl phosphate and trioctyl phosphate, sulfones such as sulfolane, lactones such as γ-butyrolactone, γ-valerolactone and α-angelicalactone, mononitriles such as acetonitrile and propionitrile sultone compounds such as 1,3-propanesultone, 1,3-butanesultone and 1,4-butanesultone, cyclic sulfite compounds such as ethylene sulfite and hexahydrobenzo[1,3,2]dioxathiolane-2-oxide (also referred to as 1,2-cyclohexanediol cylic sulfite) and 5-vinyl-hexahydro 1,3,2-benzodioxathiol-2-oxide, sulfonic acid ester compounds such as 2-propynyl methane sulfonate and methylene methane disulfonate, S=O bond-containing compounds selected from vinyl sulfone compounds such as divinyl sulfone, 1,2-bis(vinyl sulfonyl)ethane and bis(2-vinyl sulfonylethyl) ether; chain carboxylic acid anhydrides such as anhydrous acetic acid and anhydrous propionic acid; cyclic acid anhydrides such as anhydrous succinic acid, anhydrous maleic acid, anhydrous glutaric acid, anhydrous itaconic acid and 3-sulfo-propionic acid anhydride; cyclic phosphazene compounds such as methoxypentafluoro cyclotriphosphazene, ethoxypentafluoro cyclotriphosphazene, phenoxypentafluoro cyclotriphosphazene and ethoxyheptafluoro cyclotetraphosphazene, aromatic compounds having a branched alkyl group such as cyclohexyl benzene, fluorocyclohexyl benzene compounds (1-fluoro-2-cyclohexyl benzene, 1-fluoro-3-cyclohexyl benzene, 1-fluoro-4-cyclohexyl benzene), tert-butyl benzene, tert-amyl benzene and 1-fluoro-4-tert-butyl benzene, and aromatic compounds such as biphenyl, terphenyl (o-, m-, p-form), diphenyl ether, fluoro benzene, difluoro benzene (o-, m-, p-form), anisole, 2,4-difluoroanisole and partial hydride of terphenyl (1,2-dicyclohexyl benzene, 2-phenyl bicyclohexyl, 1,2-diphenyl cyclohexane, o-cyclohexylbiphenyl) may be suitably mentioned.

The above-mentioned nonaqueous solvent is ordinarily used in a mixture in order to accomplish appropriate physical properties. As the combination thereof, for example, a combination of cyclic carbonate and chain carbonate, a combination of cyclic carbonate, chain carbonate and lactone, a combination of cyclic carbonate, chain carbonate and ether, a combination of cyclic carbonate, chain carbonate and chain ester, etc. may be suitably mentioned.

[Electrolyte Salt]

As the electrolyte salt used in the present invention, the lithium salts and the onium salts described below may be suitably mentioned.

(Lithium Salt)

As the lithium salt, inorganic lithium salts such as $LiPF_6$, $LiPO_2F_2$, $LiBF_4$, and $LiClO_4$, lithium salts containing a chain fluoroalkyl group such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$, lithium salts containing a cyclic fluoroalkylene chain such as $(CF_2)_2(SO_2)_2NLi$ and $(CF_2)_3(SO_2)_2NLi$, and lithium salts having oxalate complex as anion such as lithium bis[oxalate-O,O']borate and lithium difluoro[oxalate-O,O']borate may be suitably mentioned. Among these, at least one kind selected from $LiPF_6$, $LiBF_4$, $LiN(SO_2CF_3)_2$ and $LiN(SO_2C_2F_5)_2$ is preferable, and at least one kind selected from $LiPF_6$, $LiBF_4$ and $LiN(SO_2CF_3)_2$ is more preferable.

(Onium Salt)

Also, as the onium salt, various salts from combination of the onium cation and the anion described below may be suitably mentioned.

As specific examples of the onium cation, tetramethyl ammonium cation, ethyltrimethyl ammonium cation, diethyldimethyl ammonium cation, triethylmethyl ammonium cation, tetraethyl ammonium cation, N,N-dimethyl pyrrolidinium cation, N-ethyl-N-methyl pyrrolidinium cation, N,N-diethyl pyrrolidinium cation, spiro-(N,N')-bipyrrolidinium cation, N,N'-dimethyl imidazolinium cation, N-ethyl-N'-methyl imidazolinium cation, N,N'-diethyl imidazolinium cation, N,N'-dimethyl imidazolinium cation, N-ethyl-N'-methyl imidazolinium cation, N,N'-diethyl imidazolinium cation, etc. may be suitably mentioned.

As specific examples of the anion, $PF_6$ anion, $BF_4$ anion, $ClO_4$ anion, $AsF_6$ anion, $CF_3SO_3$ anion, $N(CF_3SO_2)_2$ anion, $N(C_2F_5SO_2)_2$ anion, etc. may be suitably mentioned.

These electrolyte salts may be used alone in one kind or may be used in combination of two or more kinds.

The concentration of these all electrolyte salts when used as dissolved is ordinarily preferably 0.3 M or more, more preferably 0.7 M or more, and furthermore preferably 1.1 M or more with respect to the nonaqueous solvent. Further, the upper limit thereof is preferably 2.5 M or less, more preferably 2.0 M or less, and furthermore preferably 1.5 M or less.

[Preparation of the Nonaqueous Electrolytic Solution]

The nonaqueous electrolytic solution of the present invention may be obtained by, for example, mixing the above nonaqueous solvents, and adding to this the branched dinitrile compound in which the main chain of an alkylene chain linking the two nitrile groups has 2 or more and 4 or less of the carbon number, and the linear dinitrile compound in which an alkylene chain linking the two nitrile groups has 2 or more and 6 or less of the carbon number, with respect to the electrolyte salts and the nonaqueous electrolytic solution.

At this time, as the compound added to the nonaqueous solvent and the nonaqueous electrolytic solution that is used, the compound having small impurities as possible by being purified in advance is preferably used within a range where the productivity does not prominently decline.

The nonaqueous electrolytic solution of the present invention may be used in the first to the fourth electrochemical devices described below. As the nonaqueous electrolyte, not only liquid one, but also gellated one may be used. Furthermore, the nonaqueous electrolytic solution of the present invention may be also used for a solid polymer electrolyte. Among these, the nonaqueous electrolytic solution of the present invention is preferably used for the first electrochemical device (namely, for a lithium battery) or for the fourth electrochemical device (namely, for a lithium ion capacitor) in which a lithium salt is used as the electrolyte salts, and more preferably used for a lithium battery, and most suitably used for the lithium secondary battery.

[First Electrochemical Device (Lithium Battery)]

The lithium battery of the present invention is a general term for a lithium primary battery and a lithium secondary battery. Further, in the present description, the term of the lithium secondary battery is used as a concept also including the so-called lithium ion secondary battery. The lithium battery of the present invention comprises a positive electrode, a negative electrode and the nonaqueous electrolytic solution in which an electrolyte salt is dissolved in a nonaqueous solvent. The constituent members such as the positive electrode and the negative electrode etc. besides the nonaqueous electrolytic solution may be used without particular limitation.

For example, as the positive electrode-active material for a lithium secondary battery, a complex metal oxide with lithium, which contains one or more kinds selected from cobalt, manganese and nickel, is used. These positive electrode-active materials may be used alone in one kind or in combination of two or more kinds.

As the lithium complex metal oxide, for example, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, $LiCo_{0.98}Mg_{0.02}O_2$, etc. may be mentioned. Further, it may be used in combination such as $LiCoO_2$ and $LiMn_2O_4$, $LiCoO_2$ and $LiNiO_2$, $LiMn_2O_4$ and $LiNiO_2$.

In addition, a portion of the lithium complex metal oxide may be substituted with another element in order to improve the safety at the time of the overcharge, or the cycle property, and allow the usage at 4.3 V or more of the charge potential based on Li. For example, a portion of cobalt, manganese or nickel may be substituted with at least one or more kinds of elements such as Sn, Mg, Fe, Ti, Al, Zr, Cr, V, Ga, Zn, Cu, Bi, Mo and La, or a portion of O may be substituted with S or F, or the lithium complex metal oxide may be coated with a compound that contains these other elements.

Among these, a lithium complex metal oxide that allows the usage at 4.3 V or more of the charge potential of the positive electrode based on Li in the full-charge state, such as $LiCoO_2$, $LiMn_2O_4$ and $LiNiO_2$, is preferable, a lithium complex metal oxide that allows the usage at 4.4 V or more based on Li such as a solid solution with $LiCo_{1-x}M_xO_2$ (wherein, M is at least one or more kinds of elements selected from Sn, Mg, Fe, Ti, Al, Zr, Cr, V, Ga, Zn and Cu, 0.001≤x≤0.05), $LiCo_{1/3}Ni_{1/3}Mn_{1/3}O_2$, $LiNi_{1/2}Mn_{3/2}O_4$, and $Li_2MnO_3$ and $LiMO_2$ (M is a transitional metal such as Co, Ni, Mn and Fe) is more preferable. When a lithium complex metal oxide operating at high charge voltage is used, particularly the electrochemical properties in a broad temperature range easily decline due to the reaction with an electrolytic solution at the time of the charge. However, the lithium secondary battery related to the present invention can suppress the decline of these electrochemical properties.

Particularly, when a positive electrode containing Mn is used, the resistance of a battery tends to easily increase due to elution of Mn ion from the positive electrode, and thus the electrochemical properties in a broad temperature range tend to easily decline. However, the lithium secondary battery related to the present invention can suppress the decline of these electrochemical properties, and thus is preferable.

Furthermore, as the positive electrode-active material, lithium-containing olivine-type phosphoric acid salt may be also used. Particularly, lithium-containing olivine-type phosphoric acid salt containing at least one or more kinds selected from iron, cobalt, nickel and manganese is preferable. As specific examples thereof, $LiFePO_4$, $LiCoPO_4$, $LiNiPO_4$, $LiMnPO_4$, etc. may be mentioned.

A portion of these lithium-containing olivine-type phosphoric acid salts may be substituted with another element. A portion of iron, cobalt, nickel or manganese may be substituted with one or more kinds of an element selected from Co, Mn, Ni, Mg, Al, B, Ti, V, Nb, Cu, Zn, Mo, Ca, Sr, W and Zr, etc. or the lithium-containing olivine-type phosphoric acid salt may be coated with a compound containing these other elements or a carbon material. Among these, $LiFePO_4$ or $LiMnPO_4$ is preferable.

Further, the lithium-containing olivine-type phosphoric acid salt may be used in a mixture with, for example, the above positive electrode-active material.

In addition, As the positive electrode for a lithium primary battery, one kind, or two or more kinds of metal elements or chalcogen compounds such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$ and CoO, sulfur compounds such as $SO_2$ and $SOCl_2$, fluorocarbon (fluorographite) represented by general formula $(CF_x)_n$, etc. may be mentioned. Among these, $MnO_2$, $V_2O_5$, fluorographite etc. are preferable.

The pH of the supernatant solution when 10 g of the above-mentioned positive electrode-active material is dispersed in 100 ml distilled water, is preferably 10.0 to 12.5, and more preferably 10.5 to 12.0 since the effects of improving the electrochemical properties in a further broader temperature range are obtained easily.

Further, the positive electrode preferably contains Ni as an element since impurities such as LiOH in the positive electrode-active material tends to increase, and thus the effects of improving the electrochemical properties in a further broader temperature range are obtained easily. The atomic concentration of Ni in the positive electrode-active material is more preferably 5 to 25 atomic %, and particularly preferably 8 to 21 atomic %.

The conductive material of the positive electrode is not particularly limited as long as an electron conduction material that does not cause chemical change to the electrolytic solution. For example, graphites such as natural graphite (flattened graphite etc.) and artificial graphite, carbon black such as acetylene black, Ketjen black, channel black, furnace black, lamp black and thermal black, etc. may be mentioned. In addition, the graphite and the carbon black may be suitably mixed and used. The addition amount of the conductive material to the positive electrode mixture is preferably 1 to 10% by mass, and particularly preferably 2 to 5% by mass.

The positive electrode can be manufactured by mixing the above-mentioned positive electrode-active material with the conductive material such as acetylene black and carbon black, and a binder such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), and ethylene-propylene-diene terpolymer, and adding a high boiling-point solvent such as 1-methyl-2-pyrrolidone to this, and kneading them to prepare the positive electrode mixture, and then applying this positive electrode mixture to a current collector such as aluminum foil and lath plate made of stainless-steel, drying, pressure molding, and then subjecting the resultant to heat treatment at a temperature of 50° C. to 250° C. or so for 2 hours or so under vacuum.

The density of parts excluding the current collector of the positive electrode is ordinarily 1.5 g/cm$^3$ or more, preferably 2 g/cm$^3$ or more, more preferably 3 g/cm$^3$ or more, and further preferably 3.6 g/cm$^3$ or more in order to further enhance the capacity of the battery. Meanwhile, the upper limit is preferably 4 g/cm$^3$ or less.

As the negative electrode-active material for a lithium secondary battery, lithium metal or lithium alloy, and a carbon material which can absorb and release lithium [graphitizable carbon, non-graphitizable carbon having 0.37 nm or more of the spacing of the (002) plane, graphite having 0.34 nm or less of the spacing of the (002) plane, etc.], tin (simple substance), a tin compound, silicon (simple substance), a silicon compound, and a lithium titanate compound such as $Li_4Ti_5O_{12}$ etc. may be used alone in one kind or in combination of two or more kinds.

Among these, a high crystalline carbon material such as artificial graphite and natural graphite is preferable, and a carbon material having a graphite-type crystalline structure having 0.340 nm (nanometer) or less, particularly 0.335 to 0.337 nm of the spacing ($d_{002}$) of the lattice plane (002) is particularly preferable from the view of absorption and release ability of the lithium ion.

A ratio (I (110)/I (004)) of a peak intensity I (110) of a (110) plane and a peak intensity I (004) of a (004) plane in the graphite crystal which are obtained from X ray diffractiometry of the negative electrode sheet subjected to pressure molding so that a density of parts excluding the current collector of the negative electrode is 1.5 g/cm$^3$ or more is controlled to 0.01 or more by using artificial graphite particles having a bulky structure in which plural flattened graphite fine particles are put together or combined non-parallel to each other, or graphite particles obtained by exerting repeatedly a mechanical action, such as a compressive force, a friction force, a shearing force, etc. on flaky natural graphite particles to subject them to spheroidizing treatment, whereby the electrochemical characteristics in a further broader temperature range are improved, and therefore it is preferred. The ratio is more preferably 0.05 or more, further preferably 0.1 or more. Further, the negative electrode sheet is treated too much in a certain case and reduced in a crystallinity to reduce a discharge capacity of the battery, and therefore an upper limit thereof is preferably 0.5 or less, more preferably 0.3 or less.

Further, the high crystalline carbon material (core material) is preferably coated with a carbon material having lower crystallinity than that of the core material since the electrochemical properties in a broad temperature range becomes further better. The crystallinity of the coated carbon material can be confirmed by TEM.

When a high crystalline carbon material is used, the high crystalline carbon material reacts with a nonaqueous electrolytic solution at the time of the charge, and the electrochemical properties in a broad temperature range tends to decline due to increase of the interface resistance. However, with the lithium secondary battery related to the present invention, the electrochemical properties in a broad temperature range becomes better.

Further, as the metal compound which can absorb and release lithium as the negative electrode-active material, compounds containing at least one kind of a metal element such as Si, Ge, Sn, Pb, P, Sb, Bi, Al, Ga, In, Ti, Mn, Fe, Co, Ni, Cu, Zn, Ag, Mg, Sr and Ba may be mentioned. These metal compounds may be used in any form such as an element, an alloy, an oxide, a nitride, a sulfide, a boride, an alloy with lithium. However, the metal compound is preferably any one of an element, an alloy, an oxide and an alloy with lithium since it allows the battery to have high capacity. Among these, those containing at least one kind of an element selected from Si, Ge and Sn are preferable, those containing at least one kind of an element selected from Si and Sn are more preferable since it allows the battery to have high capacity.

The negative electrode can be manufactured in a similar manner to the manufacture of the above-mentioned positive electrode by using and kneading the conductive material, the bindert and the high boiling point solvent to prepare a negative electrode mixture, and then applying this negative electrode mixture to a current collector such as copper foil, drying, pressure molding, and then subjecting the resultant to heat treatment at a temperature of 50° C. to 250° C. or so for 2 hours or so under vacuum.

The density of parts excluding the current collector of the negative electrode is ordinarily 1.1 g/cm$^3$ or more, preferably 1.5 g/cm$^3$ or more, and particularly preferably 1.7 g/cm$^3$ or more in order to further enhance the battery capacity. Meanwhile, the upper limit is preferably 2 g/cm$^3$ or less.

Further, as the negative electrode-active material for the lithium primary battery, lithium metal or lithium alloy may be mentioned.

The structure of the lithium battery is not particularly limited, and a coin-type battery, a cylinder-type battery, an square-shaped battery, a laminate-type battery etc. having a unilamellar or laminated separator may be applied.

The separator for the battery is not particularly limited, but a unilamellar or laminated microporous film of a polyolefin such as polypropylene and polyethylene, woven fabric cloth, nonwoven fabric cloth, etc. may be used.

The lithium secondary battery of the present invention is excellent in the electrochemical properties in a broad temperature range even when the charge termination voltage is 4.2 V or more, particularly 4.3 V or more, and further the properties are good even when the charge termination voltage is 4.4 V or more. The discharge cut-off voltage is ordinarily 2.8 V or more, and further can be rendered to be 2.5 V or more. However, the discharge cut-off voltage can be rendered to be 2.0 V or more with the lithium secondary battery of the present invention. The current value is not particularly limited, but is ordinarily used in a range of 0.1 to 30 C. Further, the lithium battery of the present invention can be charged and discharged at −40 to 100° C., preferably −10 to 80° C.

In the present invention, as a countermeasure for increase of the inner pressure of the lithium battery, a method of establishing a safety valve at the cover of the battery, or a method of making incision on a member such as the battery can or the gasket may be also adopted. Further, as a countermeasure for the safety to prevent the overcharge, current shutoff mechanism that shutoffs the current upon perception of the inner pressure of the battery may be established on the cover of the battery.

[Second Electrochemical Device (Electric Double Layer Capacitor)]

The second electrochemical device of the present invention is an electrochemical device that stores the energy using the capacity of the electric double layer at the interface of the electrolytic solution and the electrode. One example of the present invention is an electric double layer capacitor. The most typical electrode-active material used in this electrochemical device is activated carbon. The capacity of the double layer increases generally in proportion to the surface area.

[Third Electrochemical Device]

The third electrochemical device of the present invention is an electrochemical device that stores the energy using the doping/de-doping reaction of the electrode. As the electrode-active material used in this electrochemical device, metal oxides such as ruthenium oxide, iridium oxide, tungsten oxide, molybdenum oxide and copper oxide, and π conjugated polymers such as polyacene and a polythiophene derivative may be mentioned. A capacitor using these electrode-active materials allows storage of the energy accompanied with the doping/de-doping reaction of the electrode.

[Fourth Electrochemical Device (Lithium Ion Capacitor)]

The fourth electrochemical device of the present invention is an electrochemical device that stores the energy using intercalation of lithium ion into a carbon material such as graphite that is the negative electrode. The electrochemical device is called the lithium ion capacitor (LIC). As the positive electrode, for example, those using an electric double layer between the activated carbon electrode and the electrolytic solution, those using the doping/de-doping reaction of π conjugated polymer electrode, etc. may be mentioned In the electrolytic solution, at least lithium salt such as LiPF$_6$ is contained.

EXAMPLES

Hereinafter, Examples of the electrolytic solution of the present invention will be described. However, the present invention is not limited to these Examples.

Examples 1 to 23, and Comparative Examples 1 to 2

Manufacture of Lithium Ion Secondary Battery

94% by mass of LiNi$_{1/3}$Mn$_{1/3}$Co$_{1/3}$O$_2$ (positive electrode-active material: the pH of the supernatant solution at the time when 10 g of a positive electrode-active material was dispersed in 100 ml distilled water was 10.8) and 3% by mass of acetylene black (conductive material) were mixed, and added to a solution in which 3% by mass of polyvinylidene fluoride (binder) was dissolved in 1-methyl-2-pyrrolidone in advance, and mixed, to prepare a paste of the positive electrode mixture. This paste of the positive electrode mixture was applied onto one surface of an aluminum foil (current collector), dried, pressure treated and punched to a desired size, to manufacture a positive electrode sheet. The density of parts excluding the current collector of the positive electrode was 3.6 g/cm$^3$. In addition, 95% by mass of artificial graphite coated with amorphous carbon (negative electrode-active material, d$_{002}$=0.335 nm) was added to a solution in which 5% by mass of polyvinylidene fluoride (binder) was dissolved in 1-methyl-2-pyrrolidone in advance, and mixed, to prepare a paste of the negative electrode mixture. This paste of the negative electrode mixture was applied onto one surface of a copper foil (current collector), dried, pressure treated and punched to a desired size, to manufacture a negative electrode sheet. The density of parts excluding the current collector of the negative electrode was 1.5 g/cm$^3$. In addition, X ray diffraction was measured using this electrode sheet. As a result, the ratio [I(110)/I(004)] of the peak intensity I(110) of the graphite crystalline (110) plane and the peak intensity I(004) of the graphite crystalline (004) plane was 0.1. Then, the positive electrode sheet, a separator made of a microporous polyethylene film, and the negative electrode sheet were laminated in this order, and the nonaqueous electrolytic solution of the composition described in Table 1 was added, to manufacture a 2032-type coin-type battery.

[Evaluation of Properties at Low Temperature After Charge and Storage at High Temperature]

Initial Discharge Capacity

Using the coin-type battery manufactured with the above-mentioned method, the coin-type battery was charged to 4.2 V of the termination voltage for 3 hours at 1 C constant current and constant voltage in 25° C. constant-temperature bath, and then discharged to 2.75 V of the cut-off voltage under 1 C constant current with the constant-temperature bath cooled to 0° C. of the temperature, to obtain the initial 0° C. discharge capacity.

Test for High Temperature Charge and Storage

Next, this coin-type battery was charged to 4.2 V of the termination voltage for 3 hours at 1 C constant current and constant voltage in 85° C. constant-temperature bath, and stored for 3 days as kept to 4.2 V. Then, the coin-type battery was put in 25° C. constant-temperature bath, and once discharged to 2.75 V of the cut-off voltage under 1 C constant current. Discharge capacity after charge and storage at high temperature Further, after that, the 0° C. discharge capacity after charge and storage at high temperature was obtained similarly to the measurement of the initial discharge capacity.

Low Temperature Properties After Charge and Storage at High Temperature

Low temperature properties after charge and storage at high temperature was obtained from the retention rate of the 0° C. discharge capacity described below.

retention rate of 0° C. discharge capacity after charge and storage at high temperature(%)=(0° C. discharge capacity after charge and storage at high temperature/initial 0° C. discharge capacity)×100

Also, the conditions for the manufacture of the battery and the properties of the battery are listed in Table 1.

TABLE 1

| | Composition of electrolyte salts Composition of nonaqueous electrolytic solution (Volume ratio of solvent) | Branched dinitrile compound (Content in nonaqueous electrolytic solution (wt %)) | Linear dinitrile compound (Content in nonaqueous electrolytic solution (wt %)) | Addition amount of linear dinitrile compound/ Addition amount of branched dinitrile compound | Total addition amount when linear dinitrile compound is used in combination with branched dinitrile compound (wt %) | Retention rate of 0° C. discharge capacity after charge and storage at 85° C. high temperature (%) |
|---|---|---|---|---|---|---|
| Example 1 | 1.2M LiPF6 FEC/EC/MEC/DMC (15/15/30/40) | 2-Methylglutaronitrile (0.05) | None | None | None | 73 |
| Example 2 | 1.2M LiPF6 FEC/EC/MEC/DMC (15/15/30/40) | 2-Methylglutaronitrile (0.6) | None | None | None | 75 |
| Example 3 | 1.2M LiPF6 FEC/EC/MEC/DMC (15/15/30/40) | 2-Methylglutaronitrile (3) | None | None | None | 72 |
| Example 4 | 1.2M LiPF6 FEC/EC/MEC/DMC (15/15/30/40) | 3-Methylglutaronitrile (0.6) | None | None | None | 69 |
| Example 5 | 1.2M LiPF6 FEC/EC/MEC/DMC (15/15/30/40) | 2-Ethylsuccinonitrile (0.6) | None | None | None | 70 |
| Example 6 | 1.2M LiPF6 FEC/EC/MEC/DMC (15/15/30/40) | 2,5-Dimethyladiponitrile (0.6) | None | None | None | 70 |
| Example 7 | 1.2M LiPF6 FEC/EC/MEC/DMC (2/28/30/40) | 2-Methylglutaronitrile (0.6) | None | None | None | 71 |
| Example 8 | 1.2M LiPF6 FEC/EC/MEC/DMC (27/3/30/40) | 2-Methylglutaronitrile (0.6) | None | None | None | 73 |
| Example 9 | 1.2M LiPF6 FEC/EC/PC/MEC/DMC (15/10/5/30/40) | 2-Methylglutaronitrile (0.6) | None | None | None | 77 |
| Example 10 | 1.2M LiPF6 FEC/EC/VC/MEC/DMC (15/13/2/30/40) | 2-Methylglutaronitrile (0.6) | None | None | None | 78 |
| Example 11 | 1.2M LiPF6 FEC/EC/MEC/DMC (15/15/30/40) | 2-Methylglutaronitrile (0.1) | Adiponitrile (0.1) | 1 | 0.2 | 77 |
| Example 12 | 1.2M LiPF6 FEC/EC/MEC/DMC (15/15/30/40) | 2-Methylglutaronitrile (3) | Adiponitrile (0.1) | 0.03 | 3.1 | 79 |
| Example 13 | 1.2M LiPF6 FEC/EC/MEC/DMC (15/15/30/40) | 2-Methylglutaronitrile (2) | Adiponitrile (0.5) | 0.25 | 2.5 | 85 |
| Example 14 | 1.2M LiPF6 FEC/EC/MEC/DMC (15/15/30/40) | 2-Methylglutaronitrile (1.5) | Adiponitrile (1) | 0.67 | 2.5 | 85 |
| Example 15 | 1.2M LiPF6 FEC/EC/MEC/DMC (15/15/30/40) | 2-Methylglutaronitrile (2.1) | Adiponitrile (1) | 0.48 | 3.1 | 81 |
| Example 16 | 1.2M LiPF6 FEC/EC/MEC/DMC (15/15/30/40) | 2-Methylglutaronitrile (0.1) | Adiponitrile (3) | 30 | 3.1 | 80 |
| Example 17 | 1.2M LiPF6 FEC/EC/MEC/DMC (15/15/30/40) | 2-Methylglutaronitrile (3) | Adiponitrile (3) | 1 | 6 | 78 |
| Example 18 | 1.2M LiPF6 FEC/EC/MEC/DMC (15/15/30/40) | 2-Methylglutaronitrile (0.6) | Adiponitrile (0.3) | 0.5 | 0.9 | 83 |

TABLE 1-continued

| | Composition of electrolyte salts Composition of nonaqueous electrolytic solution (Volume ratio of solvent) | Branched dinitrile compound (Content in nonaqueous electrolytic solution (wt %)) | Linear dinitrile compound (Content in nonaqueous electrolytic solution (wt %)) | Addition amount of linear dinitrile compound/ Addition amount of branched dinitrile compound | Total addition amount when linear dinitrile compound is used in combination with branched dinitrile compound (wt %) | Retention rate of 0° C. discharge capacity after charge and storage at 85° C. high temperature (%) |
|---|---|---|---|---|---|---|
| Example 19 | 1.2M LiPF6 FEC/EC/MEC/DMC (15/15/30/40) | 2-Methylglutaronitrile (0.6) | Succinonitrile (0.3) | 0.5 | 0.9 | 80 |
| Example 20 | 1.2M LiPF6 FEC/EC/MEC/DMC (15/15/30/40) | 2-Methylglutaronitrile (0.6) | Suberonitrile (0.3) | 0.5 | 0.9 | 82 |
| Example 21 | 1.2M LiPF6 FEC/EC/MEC/DMC (15/15/30/40) | 2-Ethylsuccinonitrile (0.6) | Suberonitrile (0.3) | 0.5 | 0.9 | 79 |
| Example 22 | 1.2M LiPF6 FEC/EC/MEC/DMC (15/15/30/40) | 2,5-Dimethyladipontbile (0.6) | Suberonitrile (0.3) | 0.5 | 0.9 | 80 |
| Example 23 | 1.2M LiPF6 EC/MEC/DMC (30/30/40) | 2-Methylglutaronitrile (0.6) | Suberonitrile (0.3) | 0.5 | 0.9 | 73 |
| Comparative Example 1 | 1.2M LiPF6 FEC/EC/MEC/DMC (15/15/30/40) | None | None | None | None | 81 |
| Comparative Example 2 | 1.2M LiPF6 FEC/EC/MEC/DMC (15/15/30/40) | None | Succinonitrile (0.6) | None | None | 64 |

Examples 24 to 25 and Comparative Example 3

Silicon (simple substance) (negative electrode-active material) was used instead of the negative electrode-active materials used in Example 2, Example 18, and Comparative Example 1, to manufacture the negative electrode sheet. 80% by mass of silicon (simple substance) and 15% by mass of acethylene black (conductive material) were mixed, and added to a solution in which 5% by mass of polyvinylidene fluoride (binder) was dissolved in 1-methyl-2-pyrrolidone in advance, and mixed, to prepare a paste of the negative electrode mixture. This paste of the negative electrode mixture was applied onto one surface of a copper foil (current collector), dried, pressure treated, and punched to a desired size, to manufacture a negative electrode sheet. Other steps were performed similarly to Example 2, Example 18 and Comparative Example 1 to manufacture a coin-type battery, and evaluations for the battery were performed. The results are listed in Table 2.

Examples 26 to 27 and Comparative Example 4

LiFePO4 (positive electrode-active material) coated with amorphous carbon was used instead of to the positive electrode-active materials used in Example 2, Example 18 and Comparative Example 1, to manufacture a positive electrode sheet. 90% by mass of LiFePO4 coated with amorphous carbon and 5% by mass of acethylene black (conductive material) were mixed, and added to a solution in which 5% by mass of polyvinylidene fluoride (binder) was dissolved in 1-methyl-2-pyrrolidone in advance, and mixed, to prepare a paste of the positive electrode mixture. This paste of the positive electrode mixture was applied onto one surface of an aluminum foil (current collector), dried, pressure treated, and punched to a desired size, to manufacture a positive electrode sheet. The charge termination voltage was 3.6 V and the discharge cut-off voltage was 2.0 V in the battery evaluations. Other steps were performed similarly to Example 2, Example

TABLE 2

| | Composition of electrolyte salts Composition of nonaqueous electrolytic solution (Volume ratio of solvent) | Branched dinitrile compound (Content in nonaqueous electrolytic solution (wt %)) | Linear dinitrile compound (Content in nonaqueous electrolytic solution (wt %)) | Addition amount of linear dinitrile compound/ Addition amount of branched dinitrile compound | Total addition amount when linear dinitrile compound is used in combination with branched dinitrile compound (wt %) | Retention rate of 0° C. discharge capacity after charge and storage at 85° C. high temperature (%) |
|---|---|---|---|---|---|---|
| Example 24 | 1.2M LiPF6 FEC/EC/MEC/DMC (15/15/30/40) | 2-Methylglutaronitrile (0.6) | None | None | None | 66 |
| Example 25 | 1.2M LiPF6 FEC/EC/MEC/DMC (15/15/30/40) | 2-Methylglutaronitrile (0.6) | Adiponitrile (0.3) | 0.5 | 0.9 | 72 |
| Comparative Example 3 | 1M LiPF6 FEC/EC/MEC/DMC (15/15/30/40) | None | None | None | None | 43 |

18 and Comparative Example 1 to manufacture a coin-type battery, and evaluations for the battery were performed. The results are listed in Table 3.

Furthermore, the nonaqueous electrolytic solution of the present invention also has effects of improving the discharge property in a broad temperature range of a primary battery.

TABLE 3

| | Composition of electrolyte salts Composition of nonaqueous electrolytic solution (Volume ratio of solvent) | Branched dinitrile compound (Content in nonaqueous electrolytic solution (wt %)) | Linear dinitrile compound (Content in nonaqueous electrolytic solution (wt %)) | Addition amount of linear dinitrile compound/ Addition amount of branched dinitrile compound | Total addition amount when linear dinitrile compound is used in combination with branched dinitrile compound (wt %) | Retention rate of 0° C. discharge capacity after charge and storage at 85° C. high temperature (%) |
|---|---|---|---|---|---|---|
| Example 26 | 1.2M LiPF6 FEC/EC/MEC/DMC (15/15/30/40) | 2-Methylglutaronitrile (0.6) | None | None | None | 80 |
| Example 27 | 1.2M LiPF6 FEC/EC/MEC/DMC (15/15/30/40) | 2-Methylglutaronitrile (0.6) | Adiponitrile (0.3) | 0.5 | 0.9 | 87 |
| Comparative Example 4 | 1M LiPF6 FEC/EC/MEC/DMC (15/15/30/40) | None | None | None | None | 59 |

Any of the lithium secondary batterys of Examples 1 to 10 described above prominently improves the electrochemical properties in a broad temperature range in comparison to the lithium secondary battery of Comparative Example 1 that does not contain the branched dinitrile compound in which the main chain of an alkylene chain linking the two nitrile groups has 2 or more and 4 or less of the carbon number in the nonaqueous electrolytic solution of the present invention, or the lithium secondary battery of Comparative Example 2 that contains the linear dinitrile compound instead of the branched dinitrile compound in which the main chain of an alkylene chain linking the two nitrile groups has 2 or more and 4 or less of the carbon number.

Further, any of the lithium secondary batterys of Examples 11 to 23 described above prominently improves the electrochemical properties in a broad temperature range in comparison to the lithium secondary battery of Comparative Example 1 that does not contain the branched dinitrile compound in which the main chain of an alkylene chain linking the two nitrile groups has 2 or more and 4 or less of the carbon number, or the linear dinitrile compound in which an alkylene chain linking the two nitrile groups has 2 or more and 6 or less of the carbon number in the nonaqueous electrolytic solution of the present invention, or the lithium secondary battery of Comparative Example 2 that contains only the linear dinitrile compound. From those described above, it was revealed that the effects of the present invention were unique effects when the nonaqueous electrolytic solution in which an electrolyte salt is dissolved in a nonaqueous solvent contains 0.001 to 5% by mass of the branched dinitrile compound in which the main chain of an alkylene chain linking the two nitrile groups has 2 or more and 4 or less of the carbon number, and further 0.1 to 30% by volume of a fluorine atom-containing cyclic carbonate, or 0.001 to 5% by mass of a linear dinitrile compound in which an alkylene chain linking the two nitrile groups has 2 or more and 6 or less of the carbon number.

In addition, similar effects are exerted when using silicon (simple substance) for the negative electrode from the comparison of Examples 24 to 25 with Comparative Example 3, and when using the lithium-containing olivine-type phosphoric acid iron salt for the positive electrode from the comparison of Examples 26 to 27 with Comparative Example 4. Accordingly, it is exhibited that the effects of the present invention are not effects depending on a specific positive electrode or negative electrode.

INDUSTRIAL APPLICABILITY

By using the nonaqueous electrolytic solution of the present invention, it is possible to obtain an electrochemical device that is excellent in the electrochemical properties in a broad temperature range. Particularly, when the nonaqueous electrolytic solution of the present invention is used as a nonaqueous electrolytic solution for an electrochemical device loaded in a hybrid electric vehicle, a plug-in hybrid electric vehicle, or a battery electric vehicle etc., it is possible to obtain an electrochemical device of which the electrochemical properties hardly decline in a broad temperature range.

The invention claimed is:

1. A nonaqueous electrolytic solution, comprising:
   a nonaqueous solvent having an electrolyte salt dissolved therein;
   a branched dinitrile compound in which a main chain of an alkylene chain linking the two nitrile groups has a carbon number of 2 to 4, the branched dinitrile compound being included in an amount of from 0.001 to 5% by mass based on a total mass of the nonaqueous electrolytic solution; and
   a linear dinitrile compound in which an alkylene chain linking the two nitrile groups has a carbon number of 2 to 6, the linear dinitrile compound being included in an amount of from 0.001 to 5% by mass based on the total mass of the nonaqueous electrolytic solution,
   wherein a mass ratio of the linear dinitrile compound to the branched dinitrile compound is from 0.01 to 0.96.

2. The nonaqueous electrolytic solution of claim 1, wherein the carbon number of the alkylene chain linking the two nitrile groups of the linear dinitrile compound is different from the carbon number of the main chain of the alkylene chain of the branched dinitrile compound.

3. The nonaqueous electrolytic solution of claim 1, wherein the main chain of the alkylene chain in the branched dinitrile compound has a hydrogen atom substituted with an alkyl group having a carbon number of 1 or 2.

4. The nonaqueous electrolytic solution of claim 3, wherein only one hydrogen atom that is bonded to an α-position carbon of one of the nitrile groups in the branched dinitrile compound is substituted with a methyl group.

5. The nonaqueous electrolytic solution of claim 1, wherein the branched dinitrile compound is at least one compound selected from the group consisting of 2-methylsuccinonitrile, 2-ethylsuccinonitrile, 2,3-dimethylsuccinonitrile, 2-ethyl-3-methylsuccinonitrile, 2,3-diethylsuccinonitrile, 2,2-dimethylsuccinonitrile, 2,2,3-trimethylsuccinonitrile, 2,2,3,3-tetramethylsuccinonitrile, 2-methylglutaronitrile, 2-ethylglutaronitrile, 2,4-dimethylglutaronitrile, 2-ethyl-4-methylglutaronitrile, 2,4-diethylglutaronitrile, 2,2-dimethylglutaronitrile, 2,2,4-trimethylglutaronitrile, 2,2,4,4-tetramethylglutaronitrile, 2,3-dimethylglutaronitrile, 2,3,4-trimethylglutaronitrile, 3-methylglutaronitrile, 3,3-dimethylglutaronitrile, 2-methyladiponitrile, 2-ethyladiponitrile, 2,5-dimethyladiponitrile, 2-ethyl-5-methyladiponitrile, 2,5-diethyladiponitrile, 2,2-dimethyladiponitrile, 2,2,5-trimethyladiponitrile, 2,2,5,5-tetramethyladiponitrile, 2,3-dimethyladiponitrile, 2,4-dimethyladiponitrile, 2,3,5-trimethyladiponitrile, 3-methyladiponitrile, and 3,3-dimethyladiponitrile, and the linear dinitrile compound is at least one compound selected from the group consisting of succinonitrile, glutaronitrile, adiponitrile, pimelonitrile, and suberonitrile.

6. The nonaqueous electrolytic solution of claim 1, wherein the mass ratio of the linear dinitrile compound to the branched dinitrile compound is from 0.2 to 0.8.

7. The nonaqueous electrolytic solution of claim 1, wherein the linear dinitrile compound and the branched dinitrile compound are included in a total amount of from 0.01 to 7% by mass based on the total mass of the nonaqueous electrolytic solution.

8. An electrochemical device, comprising:
a positive electrode;
a negative electrode; and
the nonaqueous electrolytic solution of claim 1.

9. The nonaqueous electrolytic solution of claim 1, wherein the nonaqueous solvent comprises 0.1 to 30% by volume of a cyclic carbonate comprising a fluorine atom based on a volume of the nonaqueous solvent.

10. The nonaqueous electrolytic solution of claim 9, wherein the carbon number of the alkylene chain linking the two nitrile groups of the linear dinitrile compound is different from the carbon number of the main chain of the alkylene chain of the branched dinitrile compound.

11. The nonaqueous electrolytic solution of claim 9, wherein the main chain of the alkylene chain in the branched dinitrile compound has a hydrogen atom substituted with an alkyl group having a carbon number of 1 or 2.

12. The nonaqueous electrolytic solution of claim 11, wherein only one hydrogen atom that is bonded to an α-position carbon of one of the nitrile groups in the branched dinitrile compound is substituted with a methyl group.

13. The nonaqueous electrolytic solution of claim 9, wherein the branched dinitrile compound is at least one compound selected from the group consisting of 2-methylsuccinonitrile, 2-ethylsuccinonitrile, 2,3-dimethylsuccinonitrile, 2-ethyl-3-methylsuccinonitrile, 2,3-diethylsuccinonitrile, 2,2-dimethylsuccinonitrile, 2,2,3-trimethylsuccinonitrile, 2,2,3,3-tetramethylsuccinonitrile, 2-methylglutaronitrile, 2-ethylglutaronitrile, 2,4-dimethylglutaronitrile, 2-ethyl-4-methylglutaronitrile, 2,4-diethylglutaronitrile, 2,2-dimethylglutaronitrile, 2,2,4-trimethylglutaronitrile, 2,2,4,4-tetramethylglutaronitrile, 2,3-dimethylglutaronitrile, 2,3,4-trimethylglutaronitrile, 3-methylglutaronitrile, 3,3-dimethylglutaronitrile, 2-methyladiponitrile, 2-ethyladiponitrile, 2,5-dimethyladiponitrile, 2-ethyl-5-methyladiponitrile, 2,5-diethyladiponitrile, 2,2-dimethyladiponitrile, 2,2,5-trimethyladiponitrile, 2,2,5,5-tetramethyladiponitrile, 2,3-dimethyladiponitrile, 2,4-dimethyladiponitrile, 2,3,5-trimethyladiponitrile, 3-methyladiponitrile, and 3,3-dimethyladiponitrile, and the linear dinitrile compound is at least one compound selected from the group consisting of succinonitrile, glutaronitrile, adiponitrile, pimelonitrile, and suberonitrile.

14. The nonaqueous electrolytic solution of claim 9, wherein the cyclic carbonate is at least one selected from the group consisting of 4-fluoro-1,3-dioxolane-2-one, trans-4,5-difluoro-1,3-dioxolane-2-one, and cis-4,5-difluoro-1,3-dioxolane-2-one.

15. The nonaqueous electrolytic solution of claim 9, wherein the mass ratio of the linear dinitrile compound to the branched dinitrile compound is from 0.2 to 0.8.

16. The nonaqueous electrolytic solution of claim 9, wherein the linear dinitrile compound and the branched dinitrile compound are included in a total amount of from 0.01 to 7% by mass based on the total mass of the nonaqueous electrolytic solution.

17. An electrochemical device, comprising:
a positive electrode;
a negative electrode; and
the nonaqueous electrolytic solution of claim 9.

* * * * *